L. M. BOWMAN.
DIRECTION INDICATOR.
APPLICATION FILED JAN. 7, 1916.
1,215,901.
Patented Feb. 13, 1917.
4 SHEETS—SHEET 4.
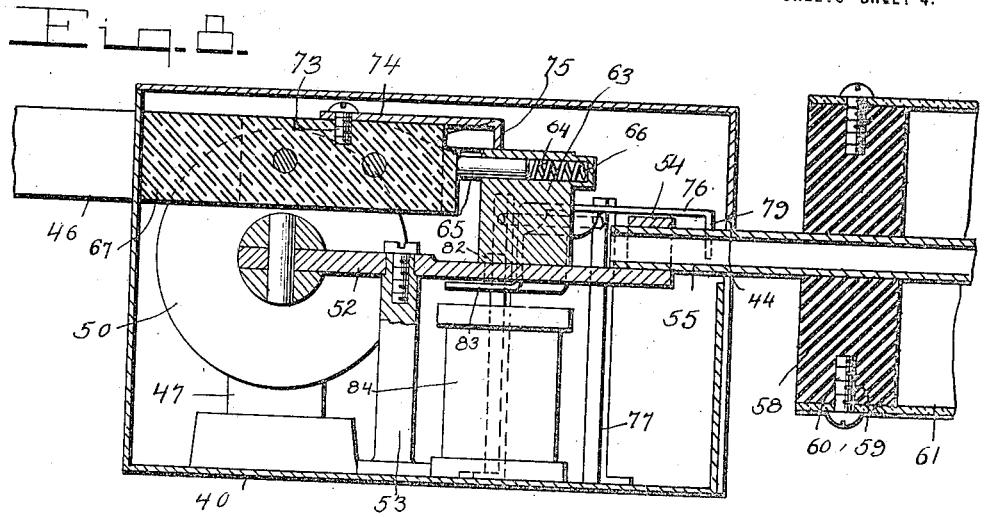
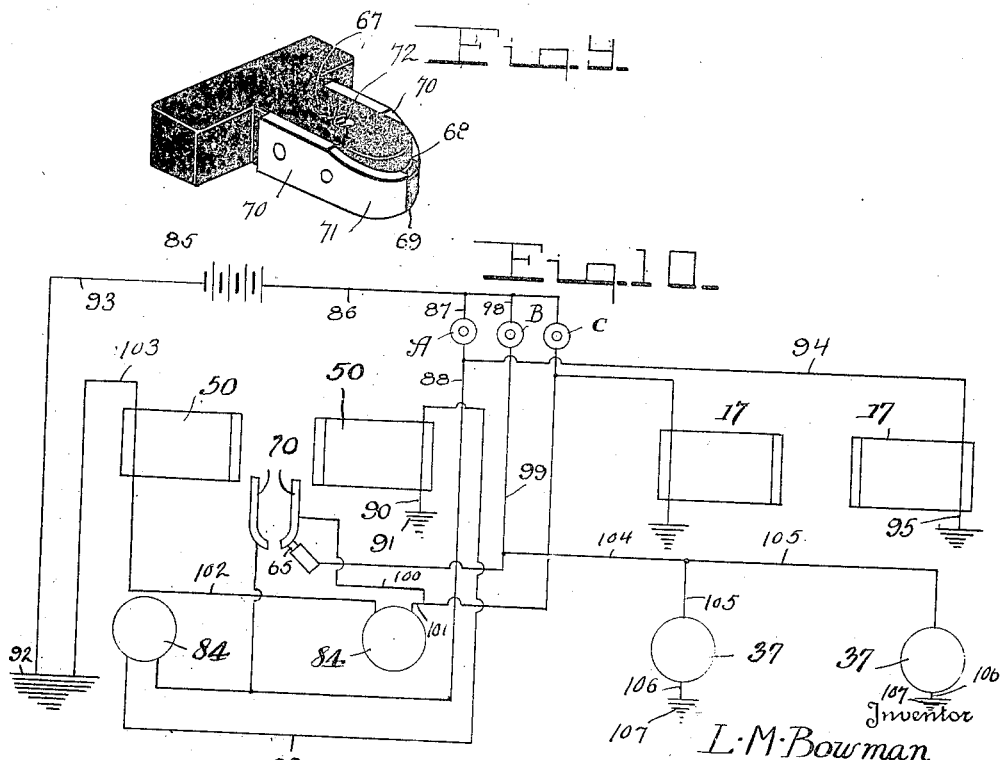
Witnesses
Inventor
L. M. Bowman
By
Attorney

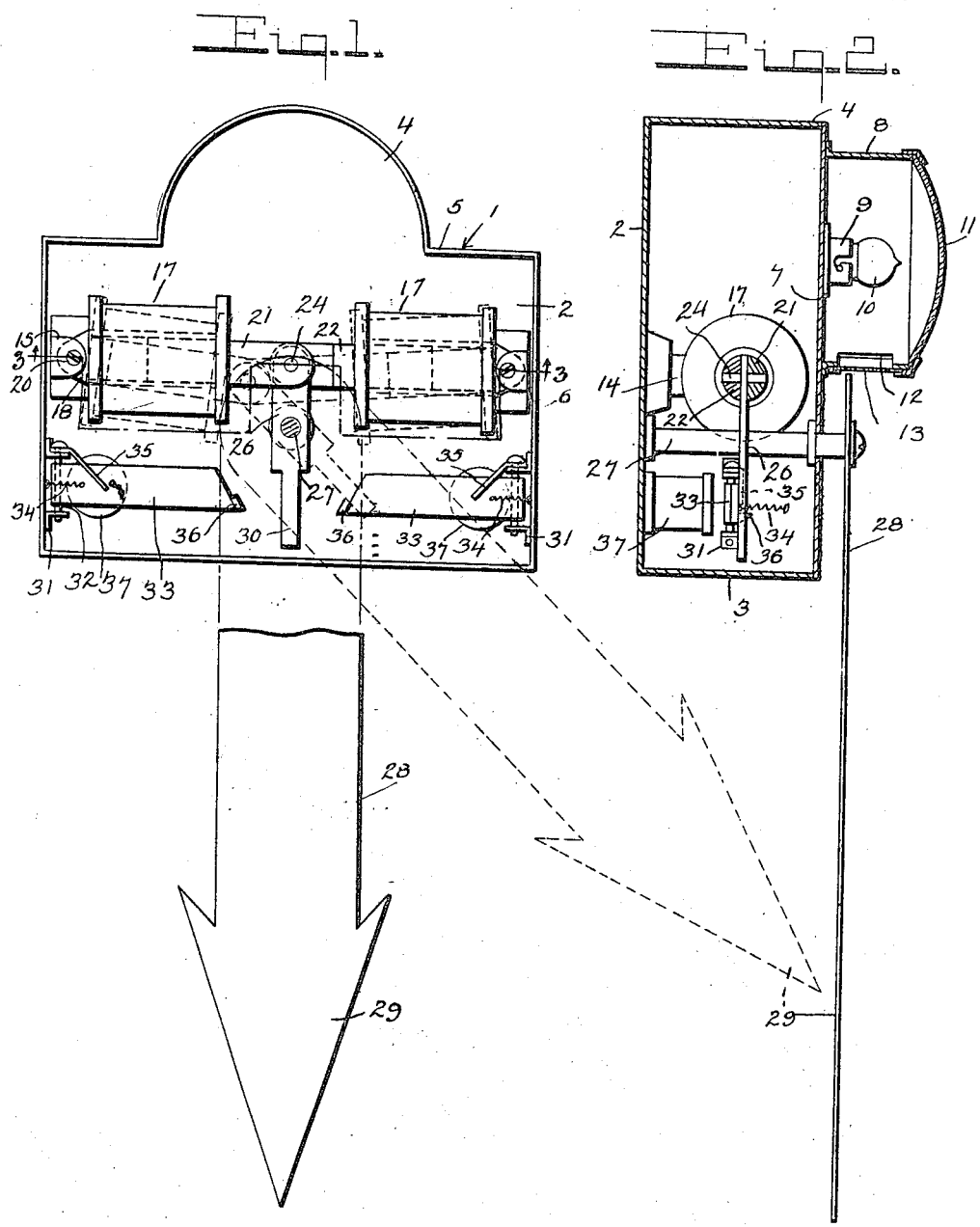

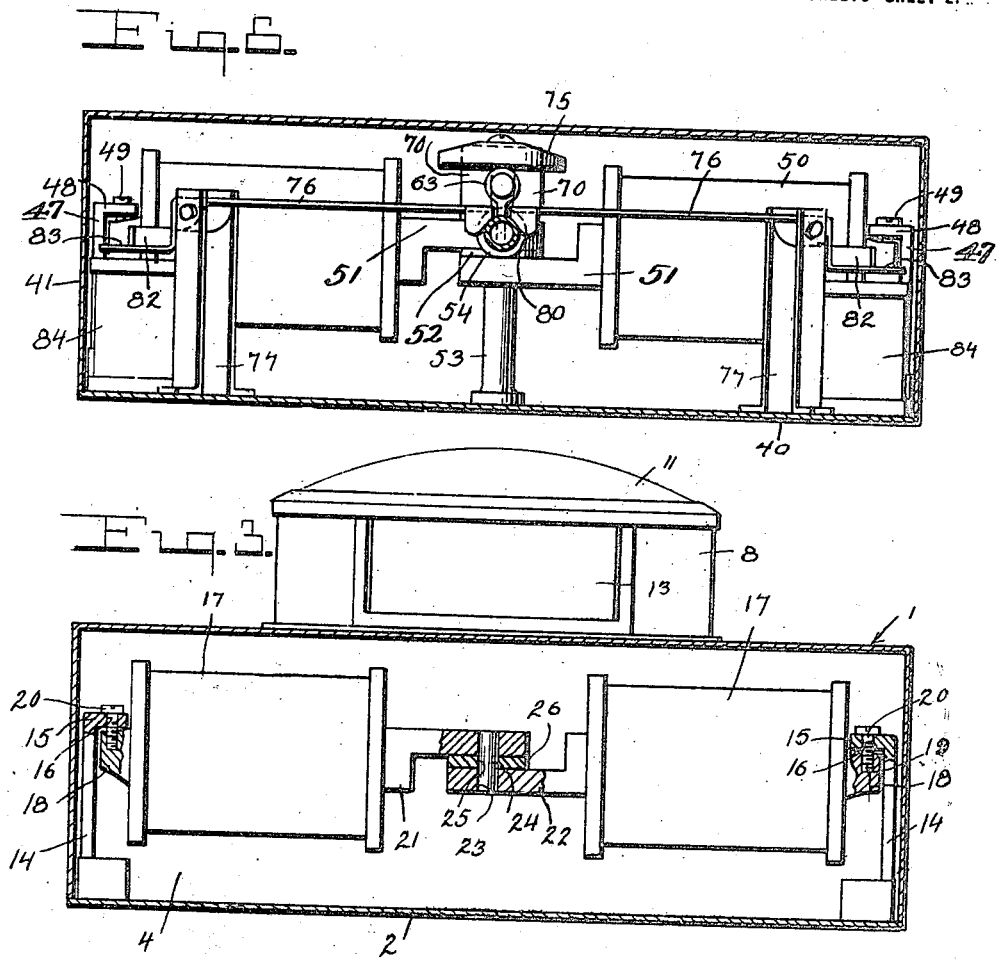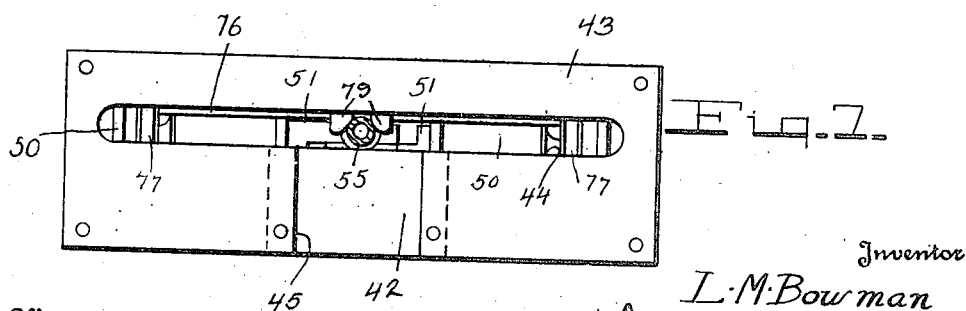

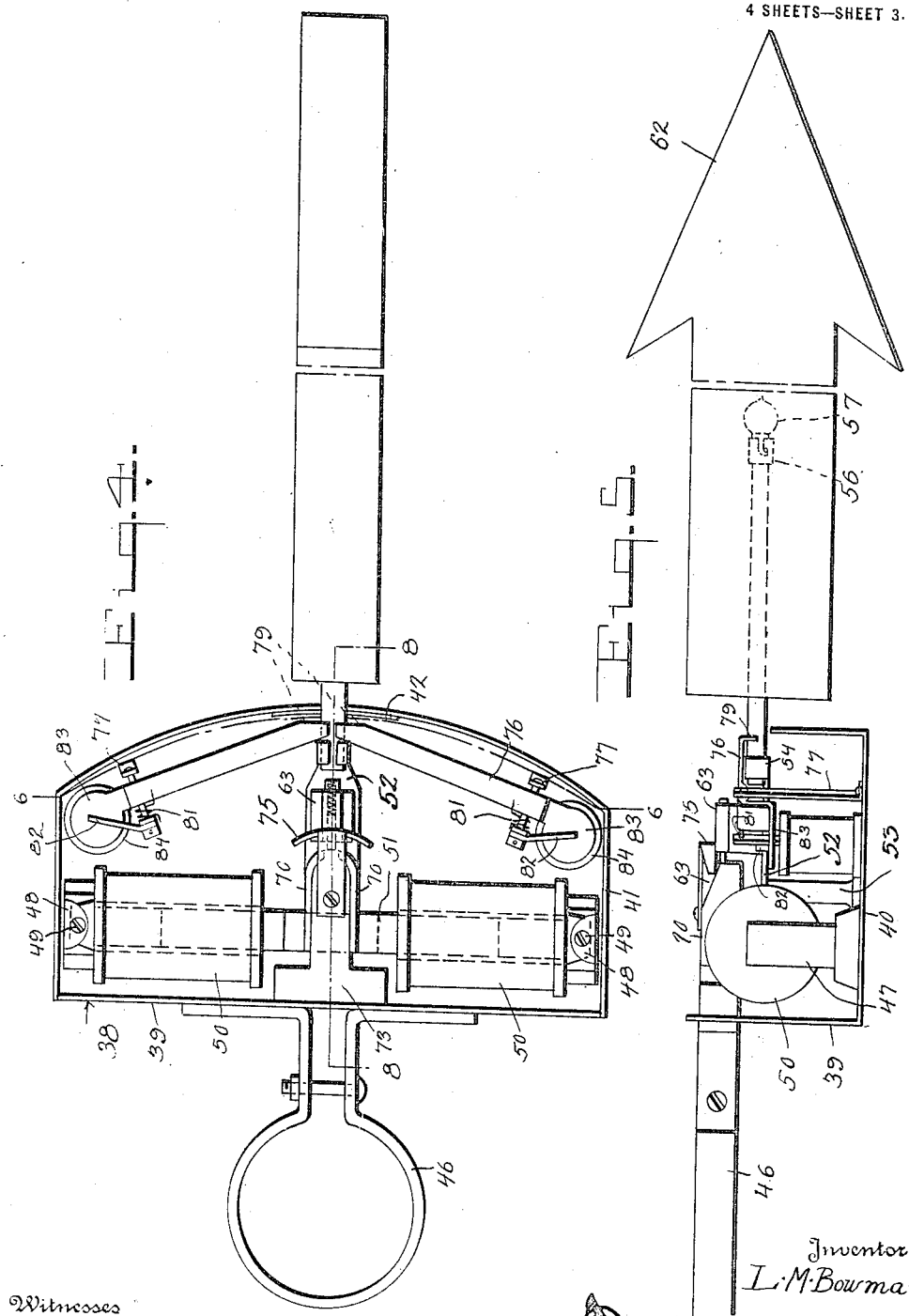

UNITED STATES PATENT OFFICE.

LEVI M. BOWMAN, OF TULSA, OKLAHOMA, ASSIGNOR OF ONE-HALF TO WILLIAM A. SMITH, OF BARTLESVILLE, OKLAHOMA.

DIRECTION-INDICATOR.

1,215,901.   Specification of Letters Patent.   Patented Feb. 13, 1917.

Application filed January 7, 1916.   Serial No. 70,857.

*To all whom it may concern:*

Be it known that I, LEVI M. BOWMAN, a citizen of the United States, residing at Tulsa, in the county of Tulsa and State of Oklahoma, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators and the principal object of the invention is to provide a device adapted to be readily attached to a motor vehicle to indicate to persons approaching the vehicle from the forward and rear ends, the direction to be taken by the operator of the vehicle.

Another object of the invention is to provide a device having indicating arrows which are adapted to be illuminated after dark to enable the signal to be easily read at night.

A further object of the invention is to provide a signal adapted to be attached to the filling spout of the usual radiator at the forward end of the motor vehicle and a signal and combined tail light adapted to be secured to the rear of the vehicle, thereby eliminating the necessity of using the ordinary type of tail light.

A still further object of the invention is to provide a novel means for locking the indicator in either of its indicating positions and holding the same until released.

A further and more specific object of the invention is to provide electromagnetic means for controlling the movement of the indicating arrows and electromagnetic means for releasing the locking means.

A still further object of the invention is to provide a device which is adapted to be controlled by three buttons, one of which controls the movement of the indicating arrow to the left, the other the movement of the indicating arrow to the right and the third the return of the indicator to neutral position.

With these and other objects in view, the invention consists in the novel combination and arrangement of parts which will be fully set forth in the following specification and accompanying drawings, in which:—

Figure 1 is a face view of a direction indicator constructed in accordance with this invention which is adapted to be used in connection with the rear end of the vehicle and showing the cover plate removed.

Fig. 2 is a vertical sectional view through Fig. 1, showing the cover plate in place.

Fig. 3 is a horizontal sectional view on line 3—3 of Fig. 1.

Fig. 4 is a top plan view of the indicator used at the forward end of the machine showing the cover plate removed.

Fig. 5 is a vertical sectional view through the matter illustrated in Fig. 4.

Fig. 6 is a transverse sectional view on line 6—6 of Fig. 4.

Fig. 7 is a front view of the casing of the structure illustrated in Fig. 4 showing the arrow removed to more clearly illustrate the details of construction.

Fig. 8 is a transverse sectional view on line 8—8 of Fig. 4.

Fig. 9 is a detail perspective view of the commutator for controlling the return movement of the arrow, and Fig. 10 is the wiring diagram of the device.

Referring to the drawings, the numeral 1 designates the casing of the device used at the rear of the vehicle comprising the back wall 2 having formed at its lower edge the bottom wall 3. This back wall 2 is provided centrally of its upper edge with the semi-circular portion 4 and a suitable top wall 5 is secured at the upper edge of the back wall and is bent to conform to the shape of the semi-circular portion as clearly shown in Fig. 1. Formed integral with the side edges of the back 2 are the vertical side walls 6 and a suitable cover plate 7 is adapted to be secured to the forward edges of the top, bottom and side walls and this cover plate conforms to the shape of the back 2 and carries a suitable hollow cylindrical extension 8 in which is centrally mounted a lamp socket 9 for supporting the tail lamp 10. The outer end of the tubular body 8 is closed by a suitable lens 11 and the said body is formed on its under side with an elongated opening 12 closed by a suitable glass panel 13 and this opening is adapted to shed light down upon the indicating arrow as clearly shown in Fig. 2.

Secured to the back wall 2 of the casing intermediate the top and bottom walls are the forwardly extending arms 14 provided at their upper ends with the ears 15 having apertures 16 formed therein. These arms are arranged in the same horizontal plane and are adapted for supporting the solenoids 17. The solenoids 17 are provided at their rear ends with the bosses 18 having the radial apertures 19 formed therein which are adapted for the reception of the threaded end of the screws 20 which pass through the openings 16 in the ears 15 and pivotally support the solenoids in place. The sliding cores of the solenoids are designated by the numeral 21 and each is provided with a reduced extension 22 having formed therein a central transverse opening 23. These openings are adapted to receive the pivot pin 24 extending through the opening 25 formed in the operating arm 26 of the indicating arrow. This operating arm is positioned between the extension 22 as shown in Fig. 3 and is secured to the shaft 27 on which the indicating arrow is mounted.

The shaft 27 above referred to is journaled in the front and rear walls of the casing as shown in Fig. 2 and extends beyond the front wall and has attached thereto the upper end of the shaft of the arrow designated by the numeral 28. This arrow is provided with a suitable head 29 which is pointed in the usual manner and it will thus be seen that when the same swings on its pivot the head will point in the direction to be taken. A suitable reduced extension 30 is formed on the operating arm 26 and this extension is adapted to engage the latch members to hold the arrow in its indicating position as will be more fully hereinafter described.

Secured to the vertical side walls of the casing are the brackets 31 for supporting the pivot pins 32 on which each latch 33 is mounted. A suitable retractile coil spring 34 is secured to the latch and to the side wall and said spring is adapted to normally tend to move the latch members 33 outwardly on their pivots. A stop 35 is provided to prevent the outward movement of the latch beyond a predetermined point and formed at the free end of each latch member is a suitable keeper 36 which is adapted to be engaged by the arm 30 when the arrow is in its indicating position to hold said arm against accidental movement. Suitable electromagnets 37 are adapted for moving the latches 33 rearwardly against the tension of the spring 34 and these electromagnets are adapted to be independently operated to allow the arrow to swing into non-indicating position when desired. The lower faces of the keepers 36 are inclined so that upon engagement by the arm 30 the terminals of the latch members will be swung back, thereby permitting the arrow to swing to the proper position and as soon as the end of the keeper has been reached, it will be seen that the latches will swing outwardly and hold said arrow.

In the modification shown in Fig. 4, the casing is designated by the numeral 38 and comprises the back wall 39 having the bottom wall 40 and side walls 41 formed integral therewith. The forward edge of the front wall is curved as clearly shown in the drawing and a suitable front wall 42 follows the curved edge as clearly shown in the drawings, and this wall 42 extends only a short distance on each side of the center of the edge and terminates in a plane below the upper edges of the side and rear walls to accommodate the indicating arrow. The front wall of the casing is best illustrated in Fig. 7 and comprises a curved plate 43 provided near its upper edge with the longitudinally extending slot 44 and centrally with an opening 45 extending from the lower edge of the wall. The slot 44 is for the accommodation of the supporting shaft of the arrow and the lower edge of the slot 44 lies in the same plane with the upper edge of the wall 42 hereinbefore referred to. It will thus be seen that the wall 42 forms a closure for the opening 45 in the front wall 43 of the plate. A suitable attaching bracket 46 is secured to the rear wall and is adapted for supporting the signal in place on the filling spout of the radiator of the vehicle on which the device is used.

Secured to the bottom wall 40 of the casing 38 are a pair of standards 47 which are positioned in alinement and are provided at their upper ends with the apertured ears 48 through which the pivot pins 49 extend. These pivot pins are for pivotally mounting the solenoids 50 having the sliding cores 51 which are pivotally connected together as shown in Fig. 6, and to which is pivoted the operating arm 52 which is pivotally mounted on the standard 53 secured centrally of the casing. The forward end of the operating arm is provided with a sleeve 54 through which the hollow stem or shaft 55 for supporting the arrow extends. This shaft is secured in the sleeve 54 and projects out through the slot 44 in the front wall of said casing and is provided at its outer end with a suitable lamp socket 56 for supporting the lamp bulb 57. A suitable block of any desired material preferably insulating, designated by the numeral 58 is supported on the hollow shaft 55 near the casing and this block is provided with threaded sockets 59 in which the screws 60 extend. These screws 60 extend through suitable openings in the rear end of the arrow body 61 which extends forwardly and is provided with the hollow head 62. It will be understood that the vertical side walls of the arrow body and head are preferably formed of a suitable translucent material preferably white in color so that when the arrow is lighted at night the light may be readily seen and the shape of the arrow clearly defined. It will also be seen that the color of the arrow will render the same readily distinguishable in the day time. Mounted on the arm 52 is a suitable block 63 of metal provided in its upper end with a socket 64 in which is slidably mounted the brush 65 which is forced outwardly by the spring 66. This brush is adapted to engage the commutator illustrated in Fig. 9 which will be more fully hereinafter described so as to complete the circuit through the solenoids when the arrow is in operating position, so that upon the passing of the current through the solenoids the arrow will be returned to non-indicating position.

The commutator above referred to is best illustrated in Fig. 9 and comprises a T-shaped insulating block 67 the stem of which is rounded as at 68 and provided with the reduced extension 69. Suitable conductor plates 70 are secured to opposite side faces of the stem and are provided with the reduced extensions 71 which are curved to conform to the curvature 68 of the stem 67 and the ends of said plates abut the side faces of the extension 69 so that a neutral point will be formed in the commutator. This commutator is adapted to be engaged by the conductor pin 65 and it will thus be seen that when the arrow is in either of its indicating positions, the conductor pin will engage one of the plates 70. A suitable screw threaded socket 72 is formed in the upper face of the block 67 and a screw 73 extends into said socket and provides a securing means for the spring brush 74 having formed thereon the downturned T-head 75. This T-head normally bears on the upper side of the block 63 so as to form an electrical contact therewith.

In order to hold the arrow in either of its indicating positions there are provided the latches 76 which are pivotally mounted on the brackets 77 near opposite sides of the casing 38 and formed at the free end of the latches 76 are the keepers 79 which extend downwardly and are provided with inclined faces 80. These keepers 79 are adapted to engage the shaft of the arrow to hold the same in either of its indicating positions. A suitable torsional spring 81 is adapted to move the free ends of the latches downwardly. Suitable stops 82 are carried by the brackets 77 and engage the armatures 83 formed on the latches 76 to limit the downward movement of the free ends of the latches as clearly illustrated in Fig. 4. In order to release the latches after the device has been operated there are provided the electromagnets 84 which are adapted to attract the armatures 83 and bring the free ends of the latches upwardly on the pivots thereby disengaging the keepers from the shaft 55 and allowing the device to return to its original position.

Upon referring to the wiring diagram it will be noted that upon pressure on the push button A, the current will flow from the power source 85 through the wire 86 into the branch wire 87 and thence through the push button and wire 88 to the electromagnet 84 at the left. The current will then pass through the wire 89 to the solenoid 50 at the right and thence back through a wire 90 to the ground 91 from whence it passes through the ground 92 and wire 93 back to the battery 85. It will thus be seen that the solenoid 50 will be energized, thereby throwing the indicating arrow to the left indicating to persons approaching the vehicle that the driver's intention is to turn to the left. Simultaneously with the energization of the front signal it will be seen that the current will pass from the wire 88 to the branch wire 94 into the right solenoid 17 at the rear end of the vehicle thence through the wire 95 into the ground. The current then passes through the ground and back to the battery through the ground 92 and wire 93. Upon completing the circuit by pressure on the push button B, it will be evident that the current will flow from the battery through the wire 86 into the branch wire 98 thence through the wire 99 to the T-headed brush 75, thence through the socket post 63 and brush 65 into the commutator plate 70, thence through the wire 100 into the wire 101 through the electromagnet 84 at the left through the wire 102 and left solenoid 50 through the wire 103 into the ground 92 and wire 93 back to the battery 85. It will thus be seen that the solenoid 50 will be energized to return the indicating arrow to its original position. Simultaneously with the operation of the indicating arrow at the forward end of the vehicle, the current will flow through the wire 104 into the branch wires 105 and through the electromagnets 37 at the rear end of the vehicle and the wires 106 and grounds 107 back to the ground 92 and through the wire 93 back to the battery. In this way it will be seen that the rear signal will be released and allowed to fall to its normal non-indicating position. Upon the pressure of the button C it will be evident that the left solenoid 50 will be energized and the electromagnet 84 energized, thereby causing the arm to swing to the opposite indicating position and upon pressure on the button B, it will be evident that it will be returned to neutral.

While in the foregoing there has been shown and described the preferred embodiment of this invention, it is to be understood that such changes may be made in the combination and arrangement of parts as will fall within the spirit and scope of the appended claims.

What is claimed is:

1. In a direction indicator, a pivoted indicating arrow, solenoids for moving the arrow into either of its indicating positions, electromagnetically released latches holding the arrow in either of its indicating positions, a stationary commutator, a brush carried by the arrow for engagement with the commutator, and conductor plates on the commutator, the conductor plates being in circuit with the solenoids and electromagnets whereby upon the passage of current through the device the circuit will be completed through one of the electromagnets and solenoids to return the arrow to its non-indicating position.

2. In a direction indicator, an indicating arrow, solenoids for moving the arrow into either of its indicating positions, latches for holding the arrow in either of its indicating positions after having been moved into place by the solenoids, electromagnets for controlling said latches, a commutator having a pair of conductor plates secured thereto, a brush for engagement with the commutator, said brush being movable with the arrow, the commutator plates being connected in series with respective latch electromagnets and solenoids whereby upon the passage of current through the device one of the electro-magnets and one of the solenoids will be energized to return the arrow to non-indicating position.

3. In a direction indicator, an indicating arrow, solenoids for moving the arrow into either of its indicating positions, said solenoids being also adapted to return the arrow to non-indicating position, electro-magnetic latches for holding the arrow in either of its indicating positions, means to complete the circuit through one of the latch electromagnets upon the movement of the arm into indicating position and to break the circuit through said electromagnets upon the energization of one of the solenoids to return the arm to non-indicating position.

4. In a direction indicator, a swinging indicating arm, pivoted solenoids, sliding cores for said solenoids, a pivot connecting the adjacent ends of the cores, a lever pivoted to the pivot for controlling the movement of the indicating arm, latches for locking said arm in either of its indicating positions and means controlling the energization of the solenoids and simultaneously controlling the releasing of the latches whereby upon energization of the solenoid, the arm will be free to return to its non-indicating position.

5. In a direction indicator, a housing, an indicating arm pivoted in the housing and extending beyond the same, solenoids pivoted within the housing and having their longitudinal axes normally disposed at right angles to the longitudinal axis of the indicating arm, sliding cores for the solenoids, the adjacent ends of the cores being pivoted together, an operating lever pivoted between the adjacent ends of the cores for controlling the movements of the indicating arm, electromagnetically released latches for holding the arm in either of its indicating positions and a commutator for controlling the energization of the solenoids and the movements of the latches for returning the arm to non-indicating position.

6. In a direction indicator, a housing, an indicating arm pivoted within the housing, solenoids controlling the movements of the indicating arm, electromagnetically controlled latches for holding the indicating arm in either of its indicating positions, an insulator within the housing, commutator plates carried by the insulator, a brush carried by the indicating arm for coöperation with the commutator plates to control the energization of the electromagnets of the latches and the solenoids whereby when the arrow is in either of its indicating positions it may be returned to neutral by the energization of one of the electromagnets and one of the solenoids.

7. In a direction indicator, a pivoted indicating arm, solenoids for moving the arm into either of its indicating positions, latches for holding the arm in either of its indicating positions, electromagnets for releasing the latches to allow the arm to return to non-indicating position, an insulator, commutator plates carried by the insulator, the adjacent ends of said plates being separated for a short distance, a brush carried by the indicating arm for coöperation with the commutator plates, said brush resting on the space between the ends of the plates when the arm is in non-indicating position and resting on one of the plates when the arm is in indicating position whereby the controlling of the energization of the electromagnets and solenoids is effected and a substantially T-shaped conducting spring for transmitting the power used for operating the device to the brush.

In testimony whereof I affix my signature in presence of two witnesses.

LEVI M. BOWMAN.

Witnesses:
F. D. Prentice,
J. M. Smith.